United States Patent
Sano

[11] Patent Number: 5,701,281
[45] Date of Patent: Dec. 23, 1997

[54] OPTICAL DISK DEVICE CAPABLE OF RECORDING A CONTROL PARAMETER ON UNUSED OPTICAL DISK AREA

[75] Inventor: Hideo Sano, Tokyo, Japan

[73] Assignee: NEC Corporation, Japan

[21] Appl. No.: 678,161

[22] Filed: Jul. 11, 1996

[30] Foreign Application Priority Data

Jul. 13, 1995 [JP] Japan ................................. 7-177251
Jul. 27, 1995 [JP] Japan ................................. 7-191747

[51] Int. Cl.$^6$ ................................................... G11B 17/22
[52] U.S. Cl. ................................. 369/32; 369/275.3
[58] Field of Search ................................. 369/32, 47, 48, 369/54, 58, 275.3, 83

[56] References Cited

U.S. PATENT DOCUMENTS

| | | | |
|---|---|---|---|
| 4,853,915 | 8/1989 | Takasago et al. | 369/32 |
| 5,107,481 | 4/1992 | Miki et al. | 369/58 |
| 5,111,444 | 5/1992 | Fukushima et al. | 369/58 |
| 5,422,871 | 6/1995 | Nakashima et al. | 369/54 |
| 5,434,838 | 7/1995 | Haneda | 369/58 |

*Primary Examiner*—Tan Dinh
*Attorney, Agent, or Firm*—Hayes, Soloway, Hennessey, Grossman & Hage, P.C.

[57] ABSTRACT

Control parameter information is written to areas of an optical disk that are not write-accessible by the host computer, when the optical disk is to be ejected from the optical disk unit, and read therefrom for use in a subsequent write or read action when the optical disk is inserted in the optical disk unit. Latest written sector and blank sector information may likewise be written and read.

12 Claims, 6 Drawing Sheets

| BYTE | | |
|---|---|---|
| 0 | CERTIFICATION EXECUTION NUMBER | 41 |
| 1 | | |
| 2 | MEDIUM WHOLE SURFACE SEEK RETRY NUMBER | 42 |
| 3 | | |
| 4 | MEDIUM WHOLE SURFACE READ RETRY NUMBER | 43 |
| 5 | | |
| 6 | MEDIUM WHOLE SURFACE OFF-TRACK COUNT NUMBER | 44 |
| 7 | | |
| 8 | FINAL ACCESS TRACK ADDRESS | 45 |
| 9 | FINAL ACCESS TRACK ADDRESS | 46 |
| 10 | FINAL ACCESS SECTOR ADDRESS | 47 |
| 11 | RESERVED | |
| ⋮ | ⋮ | |
| n | | |

OPTICAL DISK DEVICE CAPABLE OF RECORDING A CONTROL PARAMETER ON UNUSED OPTICAL DISK AREA

BACKGROUND OF THE INVENTION

1. Field of the Invention

The present invention generally relates to an optical disk device, and particularly, to an optical disk device with a random access memory (hereafter sometimes "RAM") or with a process for searching an optical disk medium.

2. Description of the Related Art

In a conventional optical disk device, a RAM holds therein control parameter information such as power data in a read action, power data in a write action, seek retry number, read retry count number, an off-track count number, defective sector number and certification execution number so that the control parameter information held in the RAM disappears when an optical disc medium is replaced as well as when power is cut.

Therefore, the conventional optical disk device, in which control parameter information held in the RAM disappears when the optical disc medium is replaced or power is cut, as described, has the drawback that it is unable to perform read and/or write actions making use of previous control parameter information. Accordingly, failure to perform read action or write action under optimum conditions results in degraded reliability and reduced process speed.

Moreover, in a conventional optical disc device, a search process on an optical disk medium is executed by reading the whole surface of the medium to search a blank sector and a written sector or by reading a target sector in a write action before deciding whether or not the sector is writable, and has the problem that a remarkably long time is needed.

The present invention has been achieved with such points in mind.

SUMMARY OF THE INVENTION

It is therefore is an object of the present invention to provide an optical disk device with a function for saving control parameter information in order to have an increased reliability and an increased process speed or a function for searching a blank sector and a written sector at a high speed.

To achieve the object, one aspect of the present invention provides an optical disk device using an optical disk having an unused area in or out of a user area thereof, the optical disk device comprising an SCSI controller connectable to a host device for transferring information therebetween, a head for writing and reading information to and from the optical disk, a control means for controlling the write action of information and the read action of information by the head to and from the optical disk and an entirety of actions of the optical disk device, a control parameter editing means for editing control parameter information in a predetermined format, a random access memory for storing therein the control parameter information, as it is edited by the control parameter editing means, a control parameter writing means for writing the control parameter information, as it is stored in the random access memory, through the head to the unused area of the optical disk, when the optical disk is to be ejected from the optical disk device, and a control parameter reading means for reading through the head the control parameter information, as it is written in the unused area of the optical disk, when the optical disk is inserted into the optical disk device.

To achieve the object, another aspect of the present invention provides an optical disk device using an optical disk having an inner manufacture zone as an unused area in an inner band out of a user area, an outer manufacture zone as an unused area in an outer band out of the user area, guard bands in the inner and outer bands, and a zone boundary unused area and a buffer area as unused areas and a test area in respective user bands in the user area, the optical disk device comprising an SCSI controller connectable to a host device for transferring information therebetween, a head for writing and reading information to and from the optical disk, a control means for controlling the write action of information and the read action of information by the head to and from the optical disk and an entirety of actions of the optical disk device, a control parameter editing means for editing control parameter information in a predetermined format, a random access memory for storing therein the control parameter information, as it is edited by the control parameter editing means, a control parameter writing means for writing the control parameter information, as it is stored in the random access memory, through the head to one of the unused areas of the optical disk, when the optical disk is to be ejected from the optical disk device, and a control parameter reading means for reading through the head the control parameter information, as it is written in said one of the unused areas of the optical disk, when the optical disk is inserted into the optical disk device.

To achieve the object, another aspect of the present invention provides an optical disk device using an optical disk having an unused area in or out of a user area thereof, the optical disk device comprising an SCSI controller connectable to a host device for transferring information therebetween, a head for writing and reading information to and from the optical disk, a control means for controlling the write action of information and the read action of information by the head to and from the optical disk and an entirety of actions of the optical disk device, a sector address information editing means for editing written sector and blank sector address information in a predetermined format, a random access memory for storing therein the written sector and blank sector address information, as it is edited by the sector address information editing means, a written sector and blank sector writing means for writing the written sector and blank sector address information, as it is stored in the random access memory, through the head to the unused area of the optical disk, when the optical disk is to be ejected from the optical disk device, and a written sector and blank sector reading means for reading through the head the written sector and blank sector address information, as it is written in the unused area of the optical disk, when the optical disk is inserted into the optical disk device.

To achieve the object, another aspect of the present invention provides an optical disk device using an optical disk having an inner manufacture zone as an unused area in an inner band out of a user area, an outer manufacture zone as an unused area in an outer band out of the user area, guard bands in the inner and outer bands, and a zone boundary unused area and a buffer area as unused areas and a test area in respective user bands in the user area, the optical disk device comprising an SCSI controller connectable to a host device for transferring information therebetween, a head for writing and reading information to and from the optical disk, a control means for controlling the write action of information and the read action of information by the head to and from the optical disk and an entirety of actions of the optical disk device, a sector address information editing means for editing written sector and blank sector address information in a predetermined format, a random access memory for storing therein the written sector and blank sector address information, as it is edited by the sector address information editing means, a written sector and blank sector writing means for writing the written sector and blank sector address information, as it is stored in the random access memory, through the head to one of the unused areas of the optical disk, when the optical disk is to be ejected from the optical disk device, and a written sector and blank sector reading means for reading through the head the written sector and blank sector address information, as it is written in said one of the unused areas of the optical disk, when the optical disk is inserted into the optical disk device.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

There will be detailed below the preferred embodiments of the present invention, with reference to the accompanying drawings. Like parts are designated by like reference characters.

Figure 1:
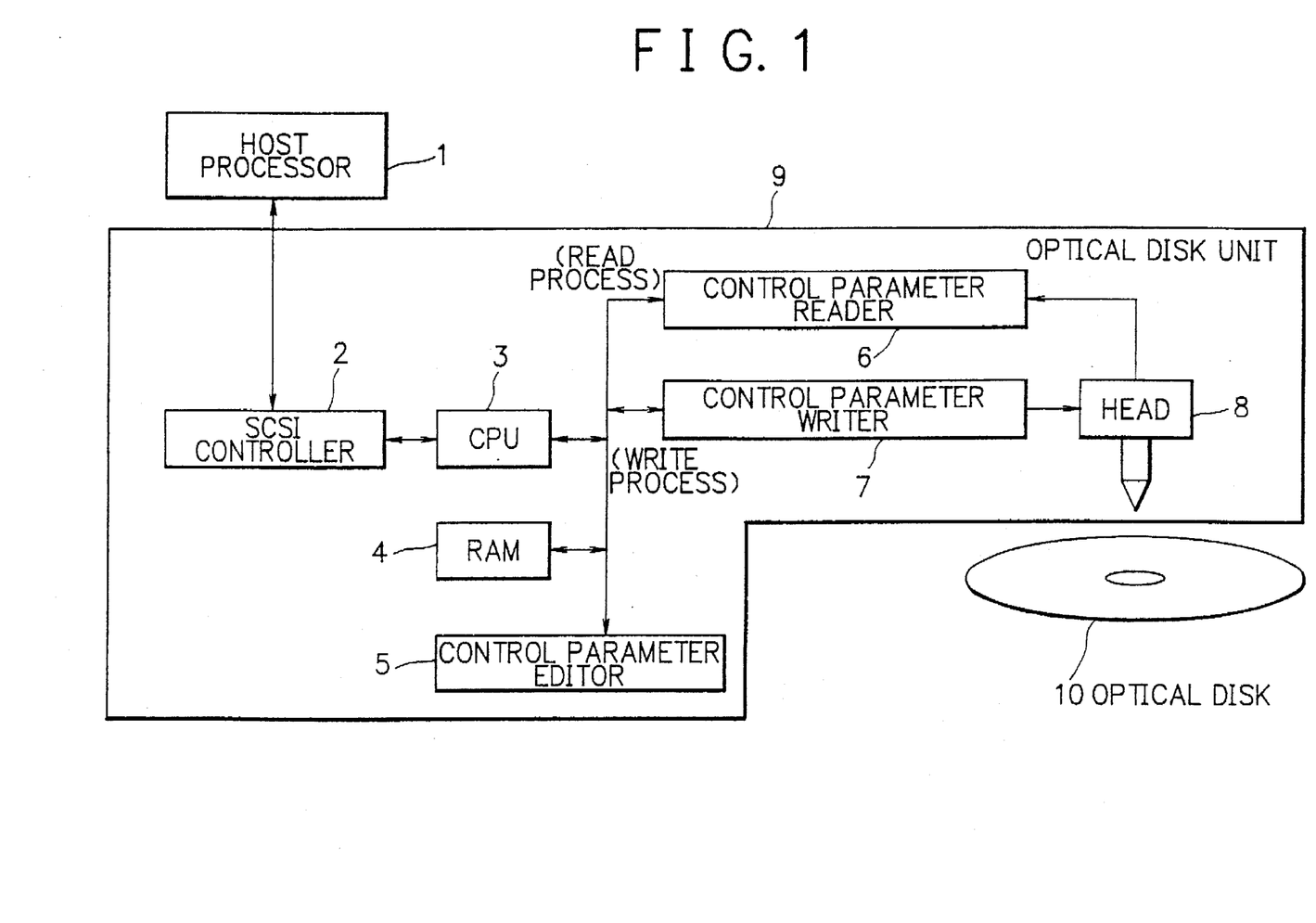
FIG. 1 is a block diagram of an optical disk unit according to an embodiment of the invention.

FIG. 1 is a block diagram of an optical disk unit according to a first embodiment of the invention.

In FIG. 1, designated at reference character 9 is the optical disk unit according to the first embodiment, and 10 is an optical disk insertable for use in the optical disk unit 9.

The optical disk unit 9 includes an SCSI controller 2 connectable to a host processor 1 for transferring information therebetween, a head 8 for writing and reading information to and from the optical disk 10, a central processing unit (hereafter "CPU") 3 as a control means for controlling the write action of information and the read action of information by the head disk 10 and varieties of actions of the optical disk unit 9, a control parameter editor 5 as a circuit or mechanism for editing control parameter information in a predetermined format, a random access memory (hereafter "RAM") 4 for storing therein the control parameter information, as it is edited by the control parameter editor 5, a control parameter writer 7 as a circuit or mechanism for writing the control parameter information, as it is stored in the RAM 4, through the head 8 to an unused area of the optical disk 10, when the optical disk 10 is to be ejected from the optical disk unit 9, and a control parameter reader 6 as a circuit or mechanism for reading through the head 8 the control parameter information, as it is written in the unused area of the optical disk 10, when the optical disk 10 is inserted in the optical disk unit 9. The control parameter information read from the optical disk 10, as well as that once stored in the RAM 4 for the writing to the optical disk 10, is edited into a predetermined format by the control parameter editor 5, before a writing thereof to the RAM 4.

Figure 2:
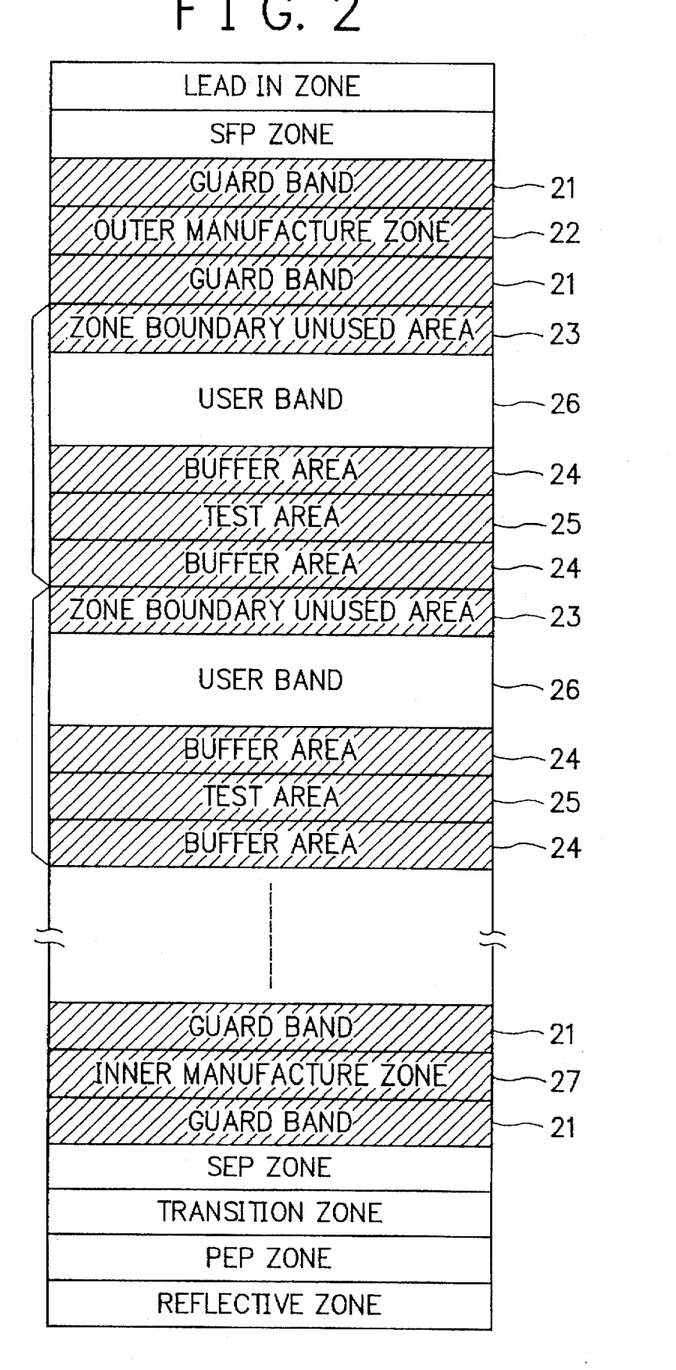
FIG. 2 is an exploded zone layout of an optical disk applicable to the optical disk units of FIGS. 1 and 5.

FIG. 2 is an exploded zone layout of the optical disk 10.

The optical disk 10 is a 2.6 G byte disk in accordance with the ECMA standard with the zone layout of FIG. 2. The disk 10 includes along an intermediate portion thereof a plurality of user bands 26 each having at an outer side thereof a zone boundary unused area 23 and at an inner side thereof a combination of a pair of buffer areas 24 and a test area 25 provided therebetween, at an outer side of the user bands 26 a combination of a pair of guard bands 21 and an outer manufacture zone 22 provided therebetween, and at an inner side of the user bands 26 a combination of a pair of guard bands 21 and an inner manufacture zone 22 provided therebetween.

Like the zone boundary unused area 23, the buffer areas 24 and the guard bands 21 as well as the test area 24, the outer manufacture area 22 and the inner manufacture area 27 are unused areas that are unusable for a normal recording of information.

In the first embodiment, the unused areas are employed for recording information of control parameters such as power data for a read action, power data for a write action, seek rely number, read retry count number, off-track count number, defective sector number and certification execution number, which information is read for use in a subsequent read or write action so that optimum reading or writing is always guaranteed.

Figure 3:
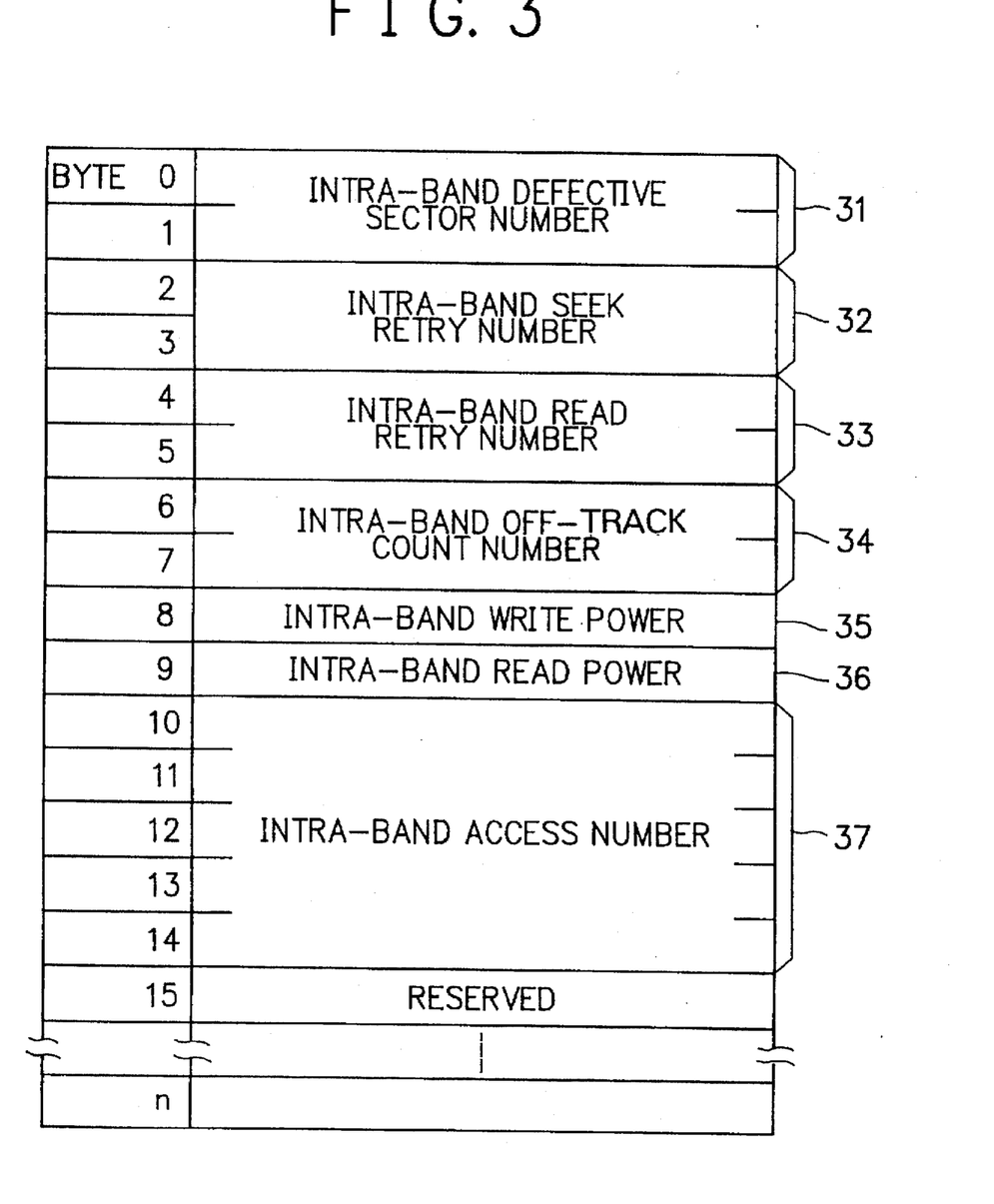
FIG. 3 is a format showing control parameter information of each user band of the optical disk of FIG. 2, as it is applied to the optical disk unit of FIG. 1.

FIG. 3 shows a format for control parameter information of each user band 26 of the optical disk 10.

The format for control parameter information of each user band 26 provides two bytes (bytes 0–1) for intra-band defective sector number 31, two bytes (bytes 2–3) for intra-band seek retry number 32, two bytes (bytes 4–5) for intra-band read retry number 33, two bytes (bytes 6–7) for intra-band off-track count number 34, one byte (byte 8) for intra-band write power data 35, one byte (byte 9) for intra-band read power data 36, and five bytes (bytes 10–14) for intra-band access number 37.

Figure 4:
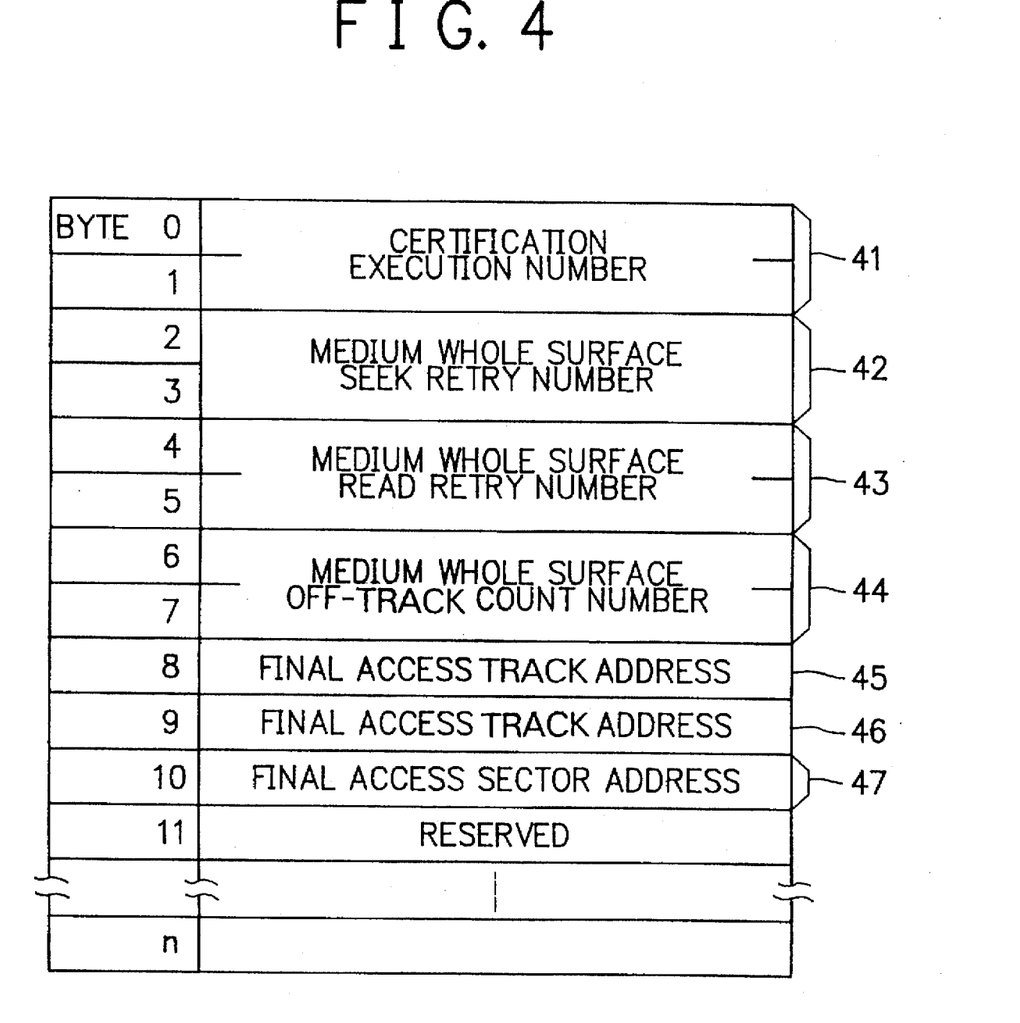
FIG. 4 is a format showing control parameter information of an entirety of the optical disk of FIG. 2, as it is applied to the optical disk unit of FIG. 1.

FIG. 4 shows a format for control parameter information of an entirety of the optical disk 10.

This format provides two bytes (bytes 0–1) for certification execution number 41, two bytes (bytes 2–3) for medium whole surface seek retry number 42, two bytes (bytes 4–5) for medium whole surface read retry number 43, two bytes (bytes 6–7) for medium whole surface off-track count number 44, one byte (byte 8) for final access track address 45, one byte (byte 9) for another final access track address 46, and one byte (byte 10) for a final access sector address 47.

The foregoing control parameter information is edited by the control parameter editor 5, to be written in the RAM 4.

In other words, when the optical disk unit 9 writes or reads information to or from an arbitary user band 26 of the optical disk 10, the control parameter editor 5 is operated by the CPU 3 to edit associated control parameter information into the formats of FIGS. 3 and 4. The edited information is stored in the RAM 4 so that, when ejection of the optical disk 10 from the optical disk unit 9 is to occur, the control parameter writer 7 is permitted to read the edited information from the RAM 4 and write the same through the head 8 to unused areas of the optical disk 10.

When the optical disk 10 is inserted in the optical disk unit 9, the CPU 3 gives the control parameter reader 6 an order to read control parameter information so that the reader 6 reads through the head 8 the control parameter information written in the unused areas of the optical disk 10, which information is edited into the formats of FIGS. 3 and 4 by the control parameter editor 5, to be written to the RAM 4.

Retry information may be processed to efficiently achieve reconstruction of the optical disk 10, such as when prohibiting use of a band that had frequently been found defective or when deciding whether a sector is defective as having frequently undergone retry.

According to the present embodiment, therefore, an optical disk unit 9 employs unused areas of an optical disk 10 so that, when ejection of the optical disk 10 from the optical disk unit 9 is to occur, associated control parameter information is written in the unused areas and, when the optical disk 10 is inserted in the optical disk unit 9, the control parameter information is read therefrom for use in a subsequent read or write action, thereby ensuring reading or writing is always conducted under optimal conditions, thus permitting an upgraded reliability and increased process speed.

Figure 5:
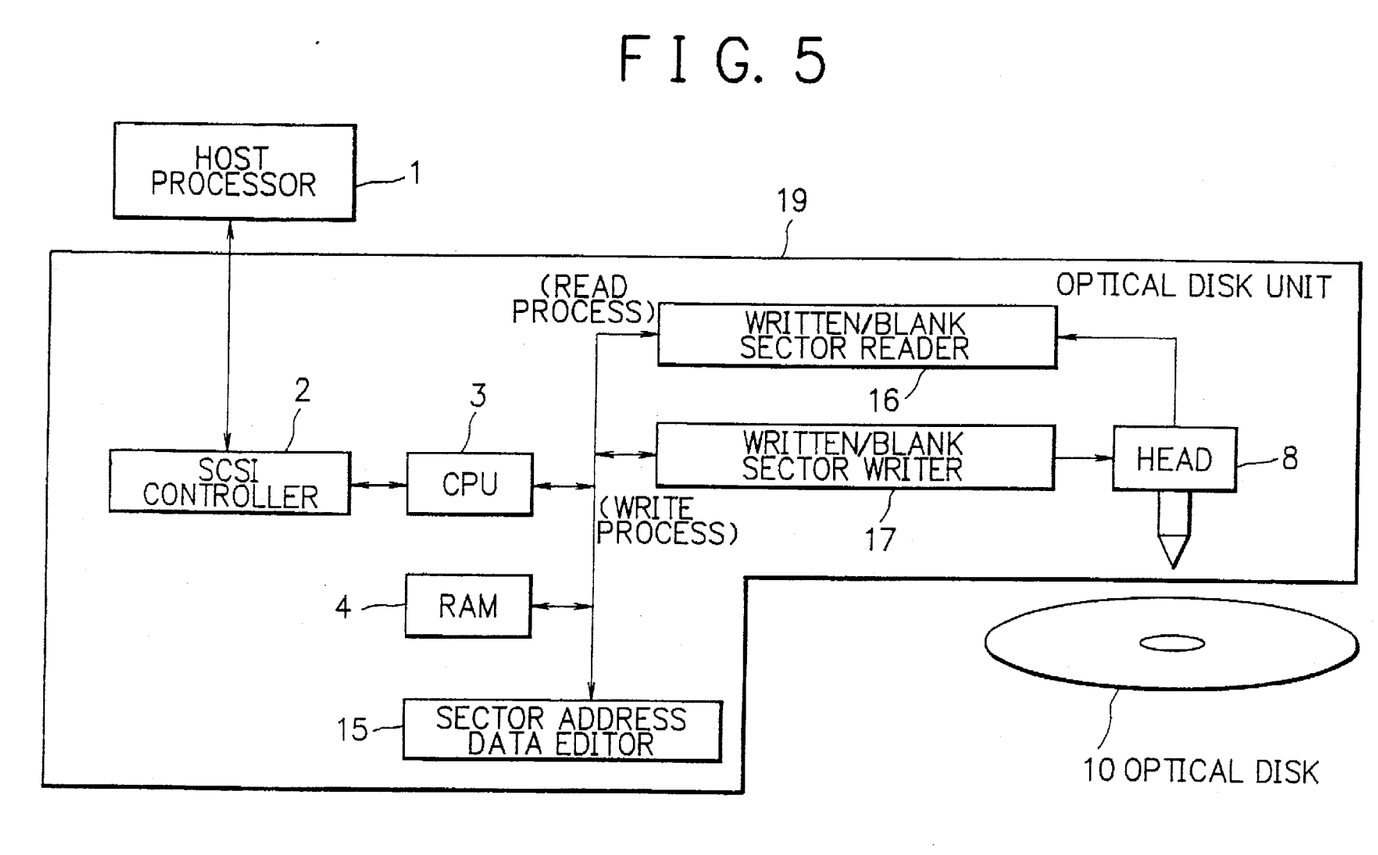
FIG. 5 is a block diagram of an optical disk unit according to another embodiment of the invention.

FIG. 5 is a block diagram of an optical disk unit according to a second embodiment of the invention.

In FIG. 5, designated by reference character 19 is the optical disk unit according to the second embodiment.

The optical disk unit 19 includes an SCSI controller 2 connectable to a host processor 1 for transferring information therebetween, a head 8 for writing and reading information to and from an optical disk 10, a CPU 3 as a control means for controlling the write action of information and the read action of information by the head 8 to and from the optical disk 10 and varieties of actions of the optical disk unit 19, a sector address data editor 15 as a circuit or mechanism for editing written sector and blank sector address information in a predetermined format, a RAM 4 for storing therein the written sector and blank sector address information, as it is edited by the sector address data editor 15, a written sector and blank sector writer 18 as a circuit or mechanism for writing the written sector and blank sector address information, as it is stored in the RAM 4, through the head 8 to unused areas of the optical disk 10, when the optical disk 10 is to be ejected from the optical disk unit 19, and a written sector and blank sector reader 16 as a circuit or mechanism for reading through the head 8 the written sector and blank sector address information, as it is written in the unused areas of the optical disk 10, when the optical disk 10 is inserted in the optical disk unit 19. The written sector and blank sector address information read from the optical disk 10 as well as that once stored in the RAM 4 for the writing to the optical disk 10, is edited into a predetermined format by the sector address data editor 15, before a writing thereof to the RAM 4.

FIG. 2 is an exploded zone layout of the optical disk 10.

The optical disk 10 includes a zone boundary unused area 23, buffer areas 24, guard bands 21, test areas 24, an outer manufacture area 22 and an inner manufacture area 27 each respectively as an unused area, and a plurality of user bands 26, as described.

In the second embodiment, the unused areas 21–25 and 27 are adequately employed for recording written sector and blank sector information that is representative for each user band of whether associated unused areas are used or not, which information is read for use in a search for an unused sector and a used sector at high speed.

Figure 6:
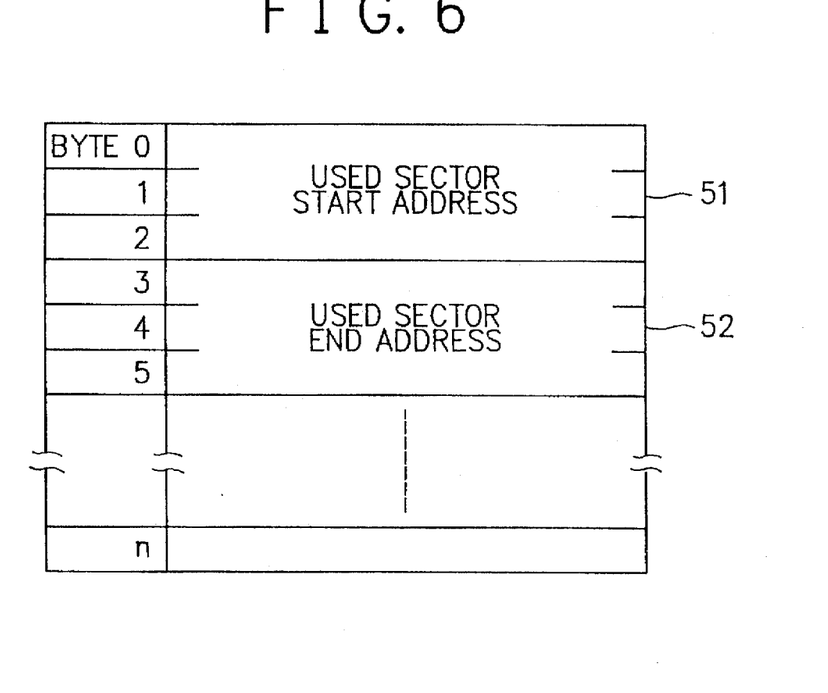
FIG. 6 is a format showing address data of used sectors of the optical disk of FIG. 2, as it is applied to the optical disk unit of FIG. 5.
Figure 7:
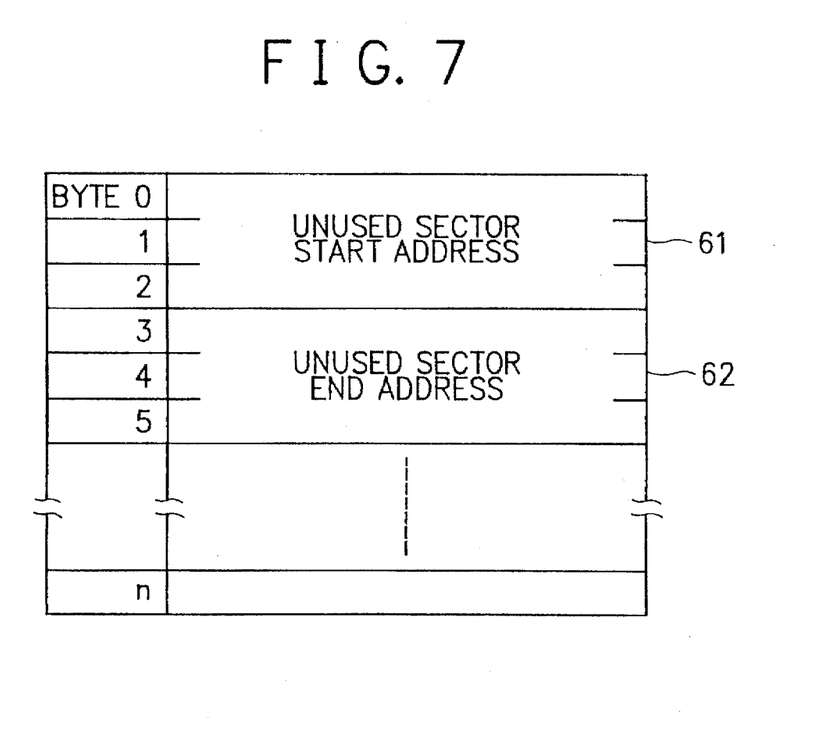
FIG. 7 is a format showing address data of unused sectors of the optical disk of FIG. 2, as it is applied to the optical disk unit of FIG. 5.

FIG. 6 shows a format for address data of used sectors of the optical disk 10, and FIG. 7 shows a format for address data of unused sectors of the optical disk 10.

As shown in FIGS. 6 and 7, the written sector and blank sector information contain address data on used areas as a combination of a used sector start address 51 of three bytes (bytes 0–2) and a used sector end address 52 of three bytes (bytes 3–5), and address data on unused areas as a combination of an unused sector start address 61 of three bytes (bytes 0–2) and an unused sector end address 62 of three bytes (bytes 3–5).

Such information is edited by the sector address data editor 15 to be written in the RAM 4.

In other words, when the optical disk unit 19 writes information to a number of user bands 26 of the optical disk 10, the sector address data editor 15 is operated by the CPU 3 to edit start and end addresses of associated sectors into the format of FIG. 6. The edited address data are stored in the RAM 4 so that when ejection of the optical disk 10 from the optical disk unit 19 is to occur, the written sector and blank sector writer 17 is permitted to read the edited data from the RAM 4 and write the same through the head 8 to unused areas of the optical disk 10.

When the optical disk 10 is inserted in the optical disk unit 19, the CPU 3 gives the written sector and blank sector reader 16 an order for a reading of the written sector and blank sector address data so that the reader 16 reads through the head 8 the address data written in the unused areas of the optical disk 10, which data are edited into the format of FIG. 6 by the sector address data editor 15, to be written to the RAM 4.

The host processor 1 is operable to provide a command for a search for a used sector so that the CPU 3 transfers the sector address data of FIG. 6, as they are stored in the RAM 4, via the SCSI controller 2 to the host processor 1.

The host processor 1 is further operable to provide a command for a search for an unused sector so that the CPU 3 transfers the sector address data of FIG. 7, as they are stored in the RAM 4 and not contained in the data of FIG. 6. via the SCSI controller 2 to the host processor 1.

According to the present embodiment, therefore, an optical disk unit 19 employs unused areas of an optical disk 10 for recording therein latest written sector and blank sector information, eliminating the need for reading a whole surface of the optical disk 10 to search a blank sector and a written sector or for reading a target sector to make a decision for a write action as to whether the sector is writable or not, thus permitting a high-speed search for a blank sector and a written sector, in particular when the optical disk 10 is employed as a postscript type of device.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. An optical disk device using an optical disk having an unused area in or out of a user area thereof, the optical disk device comprising:

an SCSI controller for operative connection to a host device for transferring information therebetween;

a head for writing and reading information to and from the optical disk;

a control means for controlling write action of information and read action of information by the head to and from the optical disk and an entirety of actions of the optical disk device;

a control parameter editing means for editing control parameter information in a predetermined format;

a random access memory for storing therein the control parameter information, as the control parameter information is edited by the control parameter editing means;

a control parameter writing means for writing the control parameter information, as the control parameter information is stored in the random access memory, through the head to the unused area of the optical disk, when the optical disk is to be ejected from the optical disk device; and a control parameter reading means for reading through the head the control parameter information, as the control parameter information is written in the unused area of the optical disk, when the optical disk is inserted into the optical disk device;

wherein said host device is unable to write data to said unused area via said optical disk device.

2. An optical disk device using an optical disk having an inner manufacture zone as an unused area in an inner band out of a user area, an outer manufacture zone as an unused area in an outer band out of the user area, guard bands in the inner and outer bands, and a zone boundary unused area and a buffer area and a test area as unused areas in a respective user band in the user area, the optical disk device comprising:

an SCSI controller for operative connection to a host device for transferring information therebetween;

a head for writing and reading information to and from the optical disk;

a control means for controlling write action of information and read action of information by the head to and from the optical disk and an entirety of actions of the optical disk device;

a control parameter editing means for editing control parameter information in a predetermined format;

a random access memory for storing therein the control parameter information, as the control parameter information is edited by the control parameter editing means;

a control parameter writing means for writing the control parameter information, as the control parameter information is stored in the random access memory, through the head to one of the unused areas of the optical disk, when the optical disk is to be ejected from the optical disk device; and a control parameter reading means for reading through the head the control parameter information, as the control parameter information is written in said one of the unused areas of the optical disk, when the optical disk is inserted into the optical disk device;

wherein said host device is unable to write data to said unused areas via said optical disk device.

3. An optical disk device using an optical disk having an unused area in or out of a user area thereof, the optical disk device comprising:

an SCSI controller for operative connection to a host device for transferring information therebetween;

a head for writing and reading information to and from the optical disk;

a control means for controlling write action of information and read action of information by the head to and from the optical disk and an entirety of actions of the optical disk device;

a sector address information editing means for editing written sector and blank sector address information in a predetermined format;

a random access memory for storing therein the written sector and blank sector address information, as the written sector and blank sector information is edited by the sector address information editing means;

a written sector and blank sector writing means for writing the written sector and blank sector address information, as the written sector and blank sector information is stored in the random access memory, through the head to the unused area of the optical disk, when the optical disk is to be ejected from the optical disk device; and a written sector and blank sector reading means for reading through the head the written sector and blank sector address information, as the written sector and blank sector information is written in the unused area of the optical disk, when the optical disk is inserted into the optical disk device;

wherein said host device is unable to write data to said unused area via said optical disk device.

4. An optical disk device using an optical disk having an inner manufacture zone as an unused area in an inner band out of a user area, an outer manufacture zone as an unused area in an outer band out of the user area, guard bands in the inner and outer bands, and a zone boundary unused area and a buffer area and a test area as unused areas in respective user bands in the user area, the optical disk device comprising:

an SCSI controller for operative connection to a host device for transferring information therebetween;

a head for writing and reading information to and from the optical disk;

a control means for controlling write action of information and read action of information by the head to and from the optical disk and an entirety of actions of the optical disk device;

a sector address information editing means for editing written sector and blank sector address information in a predetermined format;

a random access memory for storing therein the written sector and blank sector address information, as the written sector and blank sector information is edited by the sector address information editing means;

a written sector and blank sector writing means for writing the written sector and blank sector address information, as the written sector and blank sector information is stored in the random access memory, through the head to one of the unused areas of the optical disk, when the optical disk is to be ejected from the optical disk device; and a written sector and blank sector reading means for reading through the head the written sector and blank sector address information, as the written sector and blank sector information is written in said one of the unused areas of the optical disk, when the optical disk is inserted into the optical disk device;

wherein said host device is unable to write data to said unused areas via said optical disk device.

5. An optical disk device according to claim 1, wherein said optical disk has an ECMA standard zone layout.

6. An optical disk device according to claim 2, wherein said optical disk has an ECMA standard zone layout.

7. An optical disk device according to claim 3, wherein said optical disk has an ECMA standard zone layout.

8. An optical disk device according to claim 4, wherein said optical disk has an ECMA standard zone layout.

9. An optical disk device according to claim 1, wherein control means is adapted to transmit to said host device data stored in said random access memory, upon command of said host device, to facilitate search of said optical disk.

10. An optical disk device according to claim 2, wherein control means is adapted to transmit to said host device data stored in said random access memory, upon command of said host device, to facilitate search of said optical disk.

11. An optical disk device according to claim 3, wherein control means is adapted to transmit to said host device data stored in said random access memory, upon command of said host device, to facilitate search of said optical disk.

12. An optical disk device according to claim 4, wherein control means is adapted to transmit to said host device data stored in said random access memory, upon command of said host device, to facilitate search of said optical disk.

* * * * *